July 4, 1933.  W. B. ESSELEN  1,916,305
PLANT STAKE
Filed Sept. 7, 1929
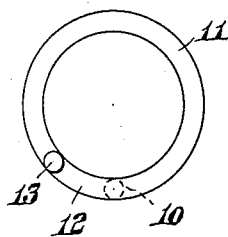
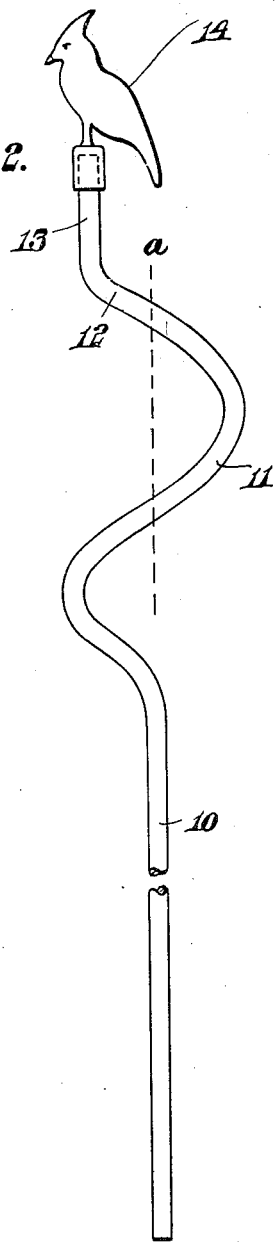 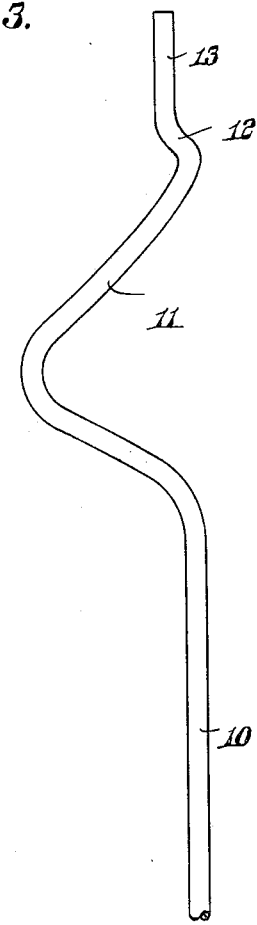
Inventor:
William B. Esselen,
by Walter E. Lombard.
Atty.

Patented July 4, 1933

1,916,305

UNITED STATES PATENT OFFICE

WILLIAM BRIGHAM ESSELEN, OF MILLIS, MASSACHUSETTS

PLANT STAKE

Application filed September 7, 1929. Serial No. 390,937.

This invention relates to plant stakes and has for its object the production of a stake formed from a metal rod, the upper end of which is curved spirally at one side of the body portion of said rod so as to encompass the stalk of a plant by rotating about the vertical axis of said body portion.

This object is attained by the device illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing:

Figure 1 represents a plan of a plant stake embodying the principles of the present invention.

Figure 2 represents a front elevation of the same showing the figure of a bird on its upper end, and Figure 3 represents a side elevation of the same.

Similar characters indicate like parts throughout the several figures of the drawing.

In the drawing, 10 is the vertical body portion of a metal rod the upper end of which is curved upwardly and around to form an elongated spiral 11 wholly at one side of the vertical axis $a$ of said rod.

The spiral 11 is considerably elongated in order that portions thereof may support the stalk of a plant at different points in the height of said stalk.

The spiral end 11 forms a complete loop as shown in Fig. 1 with one portion 12 thereof extending beyond the vertical axis of the vertical body portion 10 of the stake.

This extension 12 has extending upwardly therefrom a vertical portion 13 on the upper end of which may be disposed the figure of a bird 14.

The lower end of the body portion 10 is forced into the ground adjacent the stalk of a plant to be supported and if the stake is turned about the vertical axis of the body portion the vertical portion 13 will pass around the stalk until said stalk is entirely surrounded, thus giving the stalk all the support required.

Owing to the spiral portion 11 forming a complete loop at one side of the body portion 10, it is impossible for the stalk to become displaced therefrom.

The vertical portion 13 prevents the plant from being injured while the spiral portion 11 is being turned about the axis of the body portion in the act of encircling the stalk.

By surmounting this vertical portion 13 with the figure of a bird 14, the stake is not only made more attractive but also serves as a protection to prevent the upper end of the metal rod injuring anyone cutting flowers from the plant being supported.

The stake being formed of metal will not break and will last for a long time.

It may be made cheaply and when in use is hardly noticed, being superior to the wooden stakes in general use which disfigure a garden by being too conspicuous.

With the stake shown and described, no string around the stalk is necessary and as the stake is made of a cylindrical rod or wire, there are no sharp edges to injure the stalk.

It is believed that the operation and many advantages of the invention will be understood without further description.

Having thus described my invention, I claim:

1. A one piece plant support consisting of a metal rod, the lower portion of which is straight and free from protuberances whereby it may be rotated freely about its axis when inserted into the ground, the upper portion of said support being formed into a single greatly elongated helical loop at one side of the lower straight portion terminating in an extension adapted to be moved around the plant stalk without injury thereto.

2. A one piece plant support consisting of a metal rod, the lower portion of which is straight and free from protuberances whereby it may be rotated freely about its axis when inserted into the ground while its upper portion has formed therein a single helical loop, the wind of which has a relatively steep pitch and is positioned at one side of said straight lower portion, said loop terminating in an upward extension adapted to be moved around the plant stalk when the support is rotated about the axis of its lower portion.

Signed by me at 294 Washington St., Boston, Massachusetts, this 4th day of September, 1929.

WILLIAM BRIGHAM ESSELEN.